(12) United States Patent
Alameh et al.

(10) Patent No.: US 8,267,598 B2
(45) Date of Patent: *Sep. 18, 2012

(54) POINT TO POINT OPTICAL COMMUNICATION SYSTEM FOR CONVEYING SIGNALS BETWEEN MULTIPLE HOUSINGS OF A DEVICE

(75) Inventors: Rachid M. Alameh, Crystal Lake, IL (US); Mark A. Barabolak, Elmhurst, IL (US); Aaron L. Dietrich, Caledonia, IL (US); Michael W. Schellinger, Arlington Heights, IL (US); Maninder S. Sehmbey, Hoffman Estates, IL (US); David R. Zeiger, Mundelein, IL (US)

(73) Assignee: Motorola Mobility LLC, Libertyville, IL (US)

( * ) Notice: Subject to any disclaimer, the term of this patent is extended or adjusted under 35 U.S.C. 154(b) by 856 days.

This patent is subject to a terminal disclaimer.

(21) Appl. No.: 11/567,623

(22) Filed: Dec. 6, 2006

(65) Prior Publication Data

US 2008/0138078 A1   Jun. 12, 2008

(51) Int. Cl.
*G02B 6/36* (2006.01)
(52) U.S. Cl. ............... 385/89; 385/88; 385/92
(58) Field of Classification Search ............ 385/88, 385/89, 92
See application file for complete search history.

(56) References Cited

U.S. PATENT DOCUMENTS

| | | | |
|---|---|---|---|
| 4,549,782 A | 10/1985 | Miller | |
| 5,101,460 A | 3/1992 | Richard | |
| 5,245,622 A | 9/1993 | Jewell et al. | |
| 5,355,242 A | 10/1994 | Eastmond et al. | |
| 5,371,623 A | 12/1994 | Eastmond et al. | |
| 5,638,469 A | 6/1997 | Feldman et al. | |
| 5,832,147 A | 11/1998 | Yeh et al. | |
| 5,978,526 A | 11/1999 | Morikuni et al. | |
| 6,075,804 A | 6/2000 | Deppe et al. | |
| 6,273,990 B1 | 8/2001 | Bookbinder et al. | |
| 6,470,132 B1 | 10/2002 | Nousiainen et al. | |
| 6,628,441 B1 | 9/2003 | Staiger | |

(Continued)

FOREIGN PATENT DOCUMENTS

DE    4228696 A    6/1996

(Continued)

OTHER PUBLICATIONS

United States Patent Office, "Office Action Summary", mailed Jun. 12, 2009, pp. 1-16, U.S. Appl. No. 11/567,612, Alexandria, Virginia.

(Continued)

*Primary Examiner* — Jennifer Doan

(57) ABSTRACT

An optical communication system is provided for conveying signals between multiple housing elements of a device, where respective optical detectors and optical light sources interact via respective point to point communication paths, where the point to point communication path is maintained while the multiple housing elements of the device move relative to one another. In at least some instances, the multiple housing elements correspond to at least a pair of housing elements that are incorporated as part of a communication device having a slider configuration. In some of the same or still further instances, the point to point communication paths correspond to channels formed between the multiple housing elements, which in some instances may be at least partially recessed within one or both of the housing elements. In some instances the channels may traverse free space. In still further instances the channel may include a light pipe.

20 Claims, 3 Drawing Sheets

U.S. PATENT DOCUMENTS

| | | |
|---|---|---|
| 6,650,843 B1 | 11/2003 | Lohr et al. |
| 6,765,943 B2 | 7/2004 | Jewell |
| 6,845,184 B1 | 1/2005 | Yoshimura et al. |
| 7,283,697 B1 | 10/2007 | Morikuni et al. |
| 7,302,127 B1 | 11/2007 | Alameh et al. |
| 7,529,440 B2 | 5/2009 | Schellinger et al. |
| 7,600,925 B2 | 10/2009 | Alameh et al. |
| 7,671,628 B2 | 3/2010 | Alameh et al. |
| 7,672,594 B2 | 3/2010 | Mui et al. |
| 7,706,645 B2 | 4/2010 | Zeiger et al. |
| 2003/0064688 A1 | 4/2003 | Mizuta et al. |
| 2003/0087610 A1 | 5/2003 | Ono |
| 2003/0125008 A1 | 7/2003 | Shimamura |
| 2003/0171137 A1 | 9/2003 | Hirano et al. |
| 2004/0266477 A1 | 12/2004 | Murata |
| 2005/0111781 A1 | 5/2005 | Jain et al. |
| 2005/0201707 A1 | 9/2005 | Glebov et al. |
| 2005/0224946 A1 | 10/2005 | Dutta |
| 2005/0232553 A1 | 10/2005 | Holmquist |
| 2007/0065090 A1 | 3/2007 | Lin |
| 2007/0189031 A1 | 8/2007 | Delmar |
| 2008/0138078 A1 | 6/2008 | Alameh et al. |
| 2008/0138079 A1* | 6/2008 | Mui et al. ..................... 398/141 |

FOREIGN PATENT DOCUMENTS

| | | |
|---|---|---|
| GB | 2028534 A | 9/1979 |
| GB | 2143651 A | 2/1985 |
| WO | 8502271 A1 | 5/1985 |

OTHER PUBLICATIONS

Patent Cooperation Treaty, "PCT Notification of Transmittal of the International Search Report and the Written Opinion of the International Searching Authority, or the Declaration", Apr. 1, 2008. 25 pages, PCT/US2007/077684.

Picolight, "Product Selection Guide", Optical Components, Feb. 2006, 1 page, www.picolight.com.

\* cited by examiner

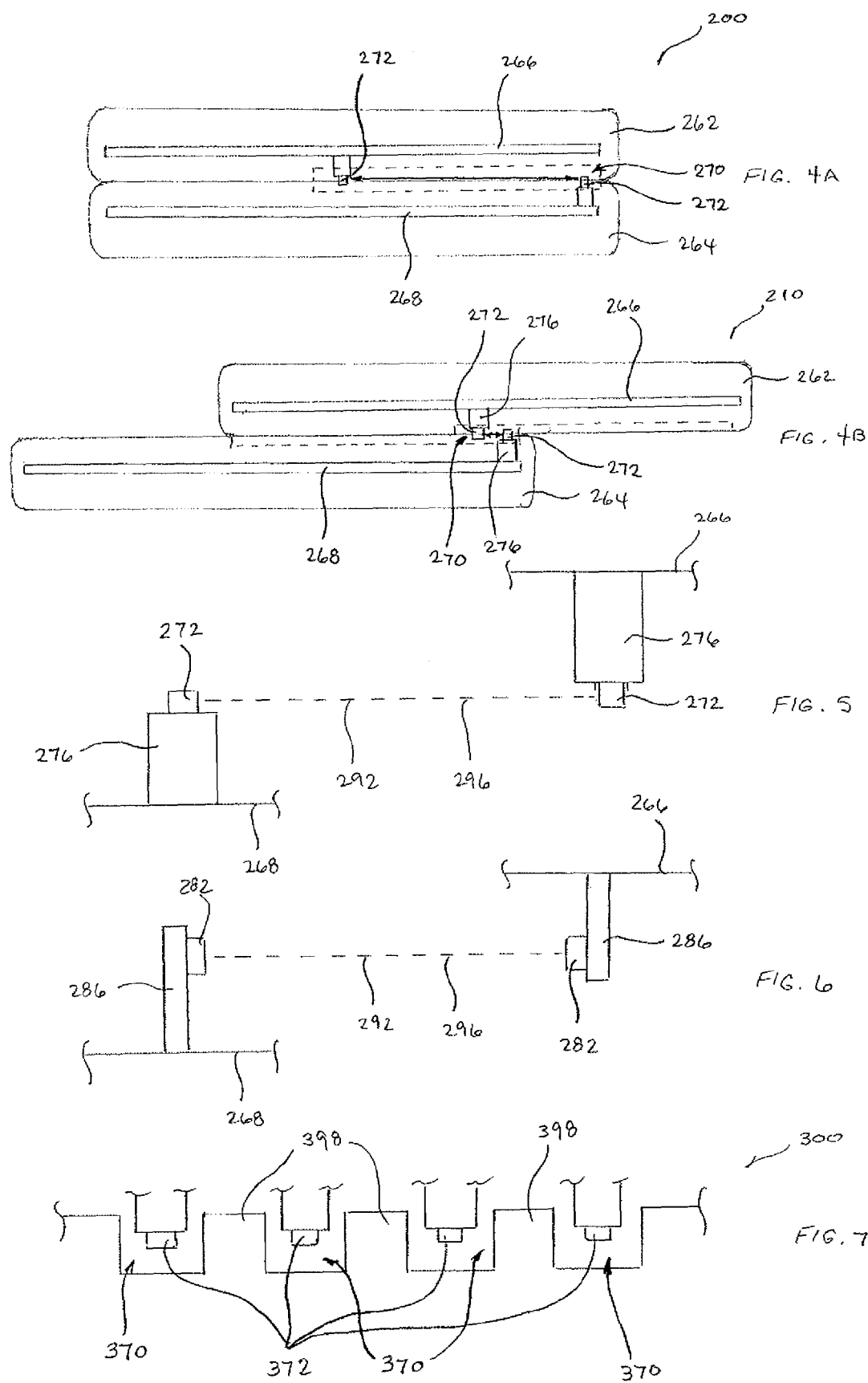

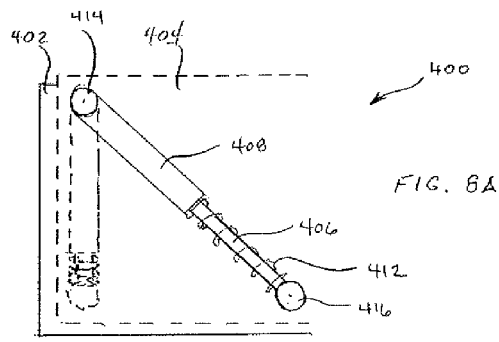
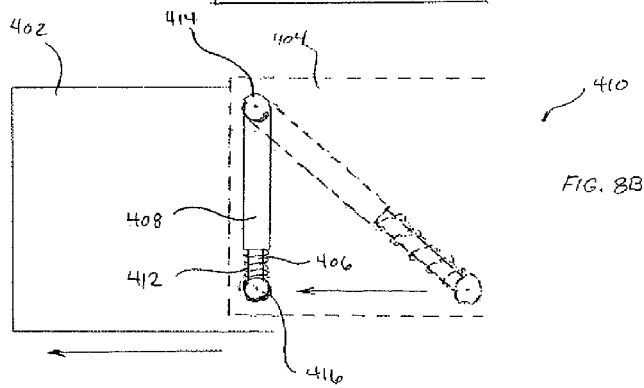
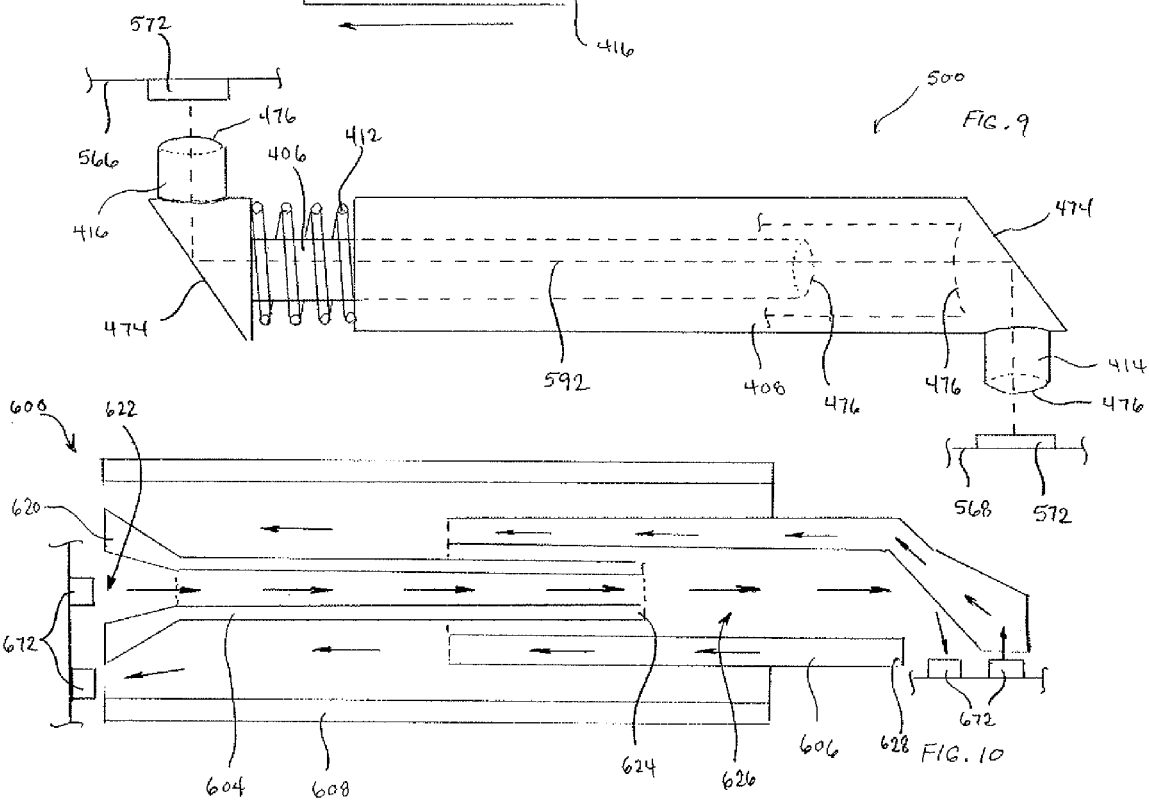

POINT TO POINT OPTICAL COMMUNICATION SYSTEM FOR CONVEYING SIGNALS BETWEEN MULTIPLE HOUSINGS OF A DEVICE

FIELD OF THE INVENTION

The present invention relates generally to a communication system between multiple housing elements of a device, which are adapted to move relative to one another, and more particularly, to an optical point to point communication system, which maintains a communication connection, during the movement of the housing elements.

BACKGROUND OF THE INVENTION

Slider devices, such as cellular telephones, represent a further form factor in addition to clam shells, candy bars, as well as others, which has enjoyed a degree of customer acceptance. In a device having a slider configuration, the two housing portions will generally shift laterally relative to one another, with each of the two housing portions typically traveling along respective paths, that are generally parallel to one another. The slider configuration enables a form factor, which is more compact when not in use, where the two housing portions are allowed to more substantially overlap or nest. When in use, the two housing portions move apart or expand to provide a device with greater surface area to simultaneously support a larger exposed keypad and display, and/or to provide greater length or distance between the microphone and speaker to better bridge the gap defined by the distance between the user's mouth and the user's ear.

However because the components which support processing of signals and/or the supply of power are each often limited to one of the two housing portions, while elements which need to receive power or access to the processing capabilities of the device are spread across both of the housing portions, the conveyance of power or signals between the two housing portions need to be supported. Power supplying devices, such as batteries, are commonly positioned within a base portion of the device. In the same or other instances, the primary processing element, such as a microprocessor, may be located in one of the two housing portions, such as the base portion, and may need to communicate with elements located in one or both of the two housing portions including instances in which a communication connection with an element in the other housing portion is desired. The base portion also commonly includes the keypad, communication circuitry, and the microphone. The slider portion often includes a display and a speaker, as well as sometimes a camera. It is further envisioned that the slider portion may also increasingly incorporate biometric sensors, such as a fingerprint sensor. In order to support the increasing number of electrical elements, as well as elements having larger size and increasing resolution (i.e. displays and/or cameras) in a multiple housing element device, such as a slider type configuration form factor, communication connections that support a larger number of signals and/or higher data rates are becoming increasingly important. Both of which are complicated by the need for the signals to be routed through the coupling element, such as a hinge element or a slider mechanism, which couples the multiple housing elements together.

Increases in the amount of data being communicated in an existing number of communication connections will often involve data signals having higher data rates, which can result in a corresponding increase in the amount of electromagnetic energy often characterized as noise and interference, in the case where the electrical signals are conveyed by one or more electrical conductors. In some instances, it may be possible to provide at least some electromagnetic shielding to help alleviate and/or address the production of any unwanted noise or interference. However, in the case where the signals are being routed though a coupling element which supports a movable coupling of a two part housing, accounting for any increases in electromagnetic noise and interference may be problematic, as there can be difficulties associated with providing suitable electromagnetic shielding.

Traditionally, communications between housing portions in at least some instances have been supported using a flexible circuit, which contains one or more signaling paths. Opposite ends of the flexible circuit are generally coupled to respective ones of the two housings, and the length of the flexible circuit is often allowed to include one or more overlapping folds that include one or more bends to selectively create a varying amount of unrealized length, which can accommodate relative movement of the two ends between positions where the two ends are selectively closer and farther apart as the two housings move relative to one another. In order to accommodate a bend in the flexible circuit, the various layers are sometimes separated. The separation of any shield layers relative to the layers containing signal conveying conductors will often impact the effectiveness of the shield layers proximate the point of any separation. Furthermore the use of a flexible circuit for purposes of conveying electrical signals and the corresponding provision for overlapping folds to account for the movement between housing portions and corresponding communication endpoints, contributes to a requirement for an often meaningful amount of space or volume to accommodate the communication pathways, where space or volume may be at a premium in devices where overall reductions in size are typically strongly desired.

At least one communication standard, namely the Mobile Industry Processor Interface (MIPI) standard, attempts to alleviate some of the concerns by incorporating serialized communications, to help minimize the number of connections, and at least partially incorporates the use of differential signaling to help reduce the amount of electromagnetic noise and interference associated with the use of relatively higher frequency communication signals. While, the use of differential signaling may help to reduce some of the noise, in some instances it still may not be sufficient.

The present inventors have recognized that electromagnetic noise and interference, which continues to be present even with the use of differential signaling, can be largely avoided by optically conveying the data signals, as opposed to electrically conveying the same. Further, the inventors have recognized that maintaining the integrity of an optical communication path in a manner which reduces the space requirements, while accommodating the relative movement of multiple housing parts, portions or elements and supporting the ability to communicate information between the multiple housing parts is also desirable. Correspondingly, the present inventors have recognized that a system including an optical light source and an optical detector, which allows the optical light source to move relative to a corresponding optical detector as the respective housing parts, portions or elements move relative to one another, while maintaining the point to point communication connection would be beneficial.

SUMMARY OF THE INVENTION

The present invention provides an optical communication system for conveying signals between a first and a second housing element of a device, where the first and second housing elements are adapted to move relative to one another. The communication system has one or more optical light sources, where each optical light source is coupled to one of the first and second housing elements, and one or more optical detectors, where each optical detector corresponds to a respective one of the one or more optical light sources between which an optical communication connection via a respective one of one or more point to point communication paths is established. Each of the one or more optical detectors is coupled to the other one of the first and second housing element, to which the respective corresponding optical light source is not coupled. As the housing elements move relative to one another, the corresponding one or more optical light sources move relative to the corresponding respective one of the one or more optical detectors, while maintaining the point to point communication connection.

In at least one embodiment, at least some of the one or more communication paths travel along respective channels, where in at least some instances one or more of the channels may be at least partially recessed into at least one of the first and second housing elements, and where in at least some of the same or other instances, some of the channels may include a light pipe.

In at least a further embodiment, the first and second housing elements are incorporated as part of a communication device having a slider configuration.

The present invention further provides a wireless communication device, which has a two part housing including a first housing element and a second housing element adapted to move relative to one another, and an optical communication system for conveying signals between the first housing element and the second housing element. The communication system includes one or more optical light sources, each optical light source being coupled to one of the first and second housing elements. The communication system further includes one or more optical detectors, each optical detector corresponding to a respective one of the one or more optical light sources between which an optical communication connection via a respective one of one or more point to point communication paths is established, each of the one or more optical detectors being coupled to the other one of the first and second housing element, to which the respective corresponding optical light source is not coupled. As the housing elements move relative to one another, the corresponding one or more optical light sources move relative to the corresponding respective one of the one or more optical detectors, while maintaining the point to point communication connection.

These and other features, and advantages of this invention are evident from the following description of one or more preferred embodiments of this invention, with reference to the accompanying drawings.

BRIEF DESCRIPTION OF THE DRAWINGS

FIGS. 4A and 4B are cut away views illustrating the interaction of elements of an optical communication system in multiple use positions, which support the conveyance of an optical communication signal between multiple housing parts of a device, in accordance with at least a further embodiment of the present invention;

FIG. 5 is an enlarged partial view of at least some of the elements of the optical communication system, illustrated in FIGS. 4A and 4B;

FIG. 6 is an enlarged partial view of an alternative configuration of elements for use in an optical communication system of the type illustrated in FIGS. 2A and 2B and FIGS. 4A and 4B;

FIG. 7 is a cross sectional view of a plurality of channels which each form a path for light to travel between an optical transmitter and receiver;

FIGS. 8A and 8B are partial internal plan views illustrating an opening mechanism for multiple use positions in a device having a two part housing, which move relative to one another, and which concurrently supports an optical communication channel of an optical communication system, in accordance with at least one embodiment of the present invention;

FIG. 9 is a partial side view of the opening mechanism illustrated in FIG. 8, for providing at least one optical communication path, in accordance with at least one embodiment of the present invention; and FIG. 10 is a partial side view of the opening mechanism illustrated in FIG. 8, for providing at least a pair of optical communication paths, in accordance with at least a further embodiment of the present invention.

DETAILED DESCRIPTION OF THE PREFERRED EMBODIMENT(S)

Figure 1:
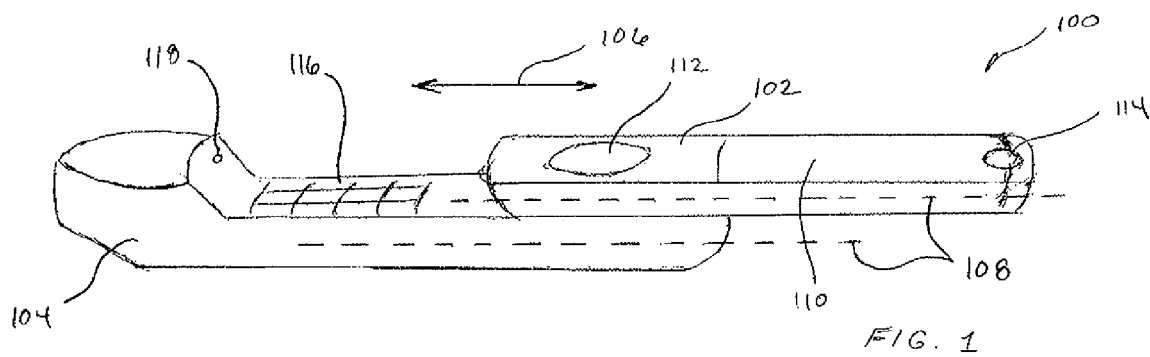
FIG. 1 is an exemplary wireless communication device having a two part housing, which each move relative to one another along a substantially parallel path.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary wireless communication device 100 having a two part housing including an upper housing 102 or slider portion, and a lower housing 104 or base portion, which each move 106 relative to one another along a substantially parallel path 108, where the two part housing corresponds to a slider configuration. In the illustrated example, the upper housing 102 includes a display area 110, a user input area 112 and one or more speaker ports 114. The user input area can include one or more of a navigational input section for example allowing for the four-way movement of a cursor on the display (i.e. up, down, left and right), and a selection input section for example allowing for the selection of highlighted display elements. In some instances, at least portions of the navigational input section may overlap portions of the selection input section. The lower housing 104 includes a further user input section in the form of a keypad 116, as well as a microphone 118. In some instances, at least one of the upper housing 102 and the lower housing 104 may additionally include a camera.

Generally, one of the upper housing 102 and the lower housing 104 will include a power supply, such as a battery, as well as computing capabilities, such as a microprocessor. However, because both housing parts will often have elements that require one or both of power, data and/or control signals, and some of the elements will not be co-located relative to a particular housing element, with respect to the element that supplies the power, data and/or control signals, signals will commonly need to be conveyed between the upper and lower housings 102 and 104.

Figure 2A:
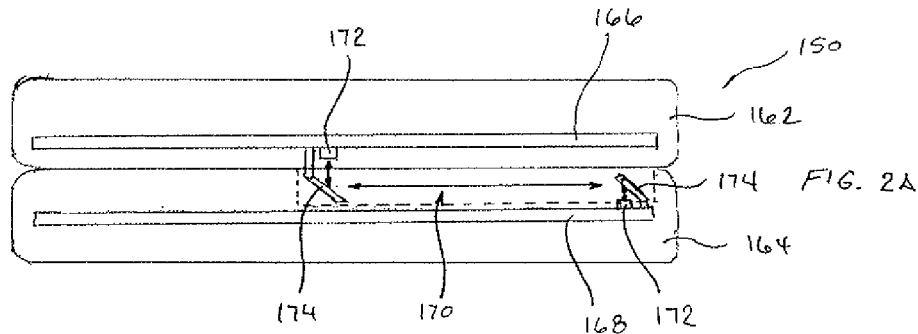
FIGS. 2A and 2B are cut away views illustrating the interaction of elements of an optical communication system in multiple use positions, which support the conveyance of an optical communication signal between multiple housing parts of a device, in accordance with at least one embodiment of the present invention.
Figure 2B:
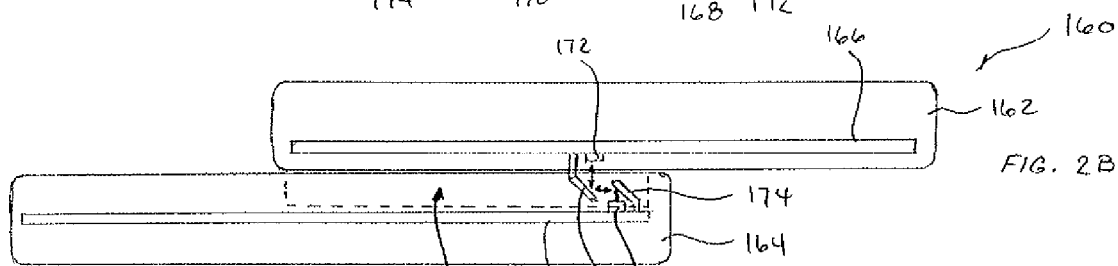

FIGS. 2A and 2B illustrate cut away views 150 and 160 showing the interaction of elements of an optical communication system in multiple use positions, which support the conveyance of an optical communication signal, such as data and/or control signals, between multiple housing parts or elements of a device, in accordance with at least one embodiment of the present invention. In each of FIGS. 2A and 2B, an upper housing 162 and a lower housing 164 are illustrated in a pair of use positions, between which the housing elements have moved relative to one another. FIG. 2A illustrates the upper and lower housings 162 and 164 in a position more closely associated with a closed position, and FIG. 2B illustrates the upper and lower housings 162 and 164 in a position more closely associated with an open position.

In each instance, the upper and lower housings 162 and 164 are each shown including a respective substrate 166, 168, such as a printed circuit board, to which one or more components can be coupled, and which moves with the respective movement of the upper and lower housing 162, 164. One or both of the upper and lower housings additionally includes the outline of a channel 170, which is illustrated using dashed lines. The channel 170 represents a free space path through which light can travel. In the illustrated embodiment, the channel 170 is shown largely formed as part of the lower housing 164, where the channel 170 has a length which extends at least the amount of anticipated relative movement between the upper and lower housings 162 and 164.

Each substrate 166 and 168 includes one or more optical elements 172, such as an optical light source and/or an optical detector, which respectively produces an optical signal or detects an optical signal. An optical element 172 associated with one of the upper and lower housing 162 or 164 is generally paired with an optical element 172 of the other one of the upper and lower housing 162 or 164. Within the pair of optical elements 172, at least one of the optical elements 172 includes the capabilities of an optical light source and at least the other optical element of the pair includes the capabilities of an optical detector. In this way, light produced by one of the optical elements 172, which reaches the other one of the pair of optical elements 172, can be detected. In some instances, it is possible that both optical elements 172, which form a pair, could each have the capability to produce an optical signal and detect an optical signal, and in essence have optical transceiver capabilities. In such an instance, the receive portion of the optical transceiver and the transmit portion of the optical transceiver can be selectively enabled to avoid interfering with the communication of any data in an opposite direction.

Alternatively, the light produced by the optical transmitter portion of the transceiver could be coded so as to be incompatible with the optical receiver portion of the transceiver, and thus reduce the potential for interference. However, in such an instance the other optical element 172 of the pair would need to be matched to be compatible with the respective complementary transmit/receive characteristics of the first optical element 172. For example, one transceiver of the pair could be adapted to transmit at a frequency corresponding to a first frequency of light (i.e. blue light), and receive at an alternative second frequency of light (i.e. red). The other transceiver of the pair could be adapted to transmit at the alternative second frequency of light (i.e. red light), and receive at the first frequency of light (i.e. blue). In this way, an optical communication signal in each direction within a particular channel could be simultaneously supported while reducing the chances of interference between the two signals.

Still further it is possible that the channel could be divided into subchannels, where the transmit portion of the first transceiver and the receive portion of the second transceiver share a first subdivision of the channel, and the transmit portion of the second transceiver and the receive portion of the first transceiver share a second subdivision of the channel. Such an embodiment assumes that there is sufficient isolation between the subchannels so as to sufficiently avoid any interference which might preclude the corresponding communication of data.

In the embodiment illustrated in FIGS. 2A and 2B, each substrate 166 and 168 additionally includes an angled reflective surface 174, which redirects the light, which is entering or exiting the corresponding optical element 172 associated with the same substrate 166 or 168, and redirects the light in at a point which is in line with the channel 170, so that the light travels in a direction, which is consistent with the anticipated relative movement 106 between the upper and lower housing 162 and 164. In the illustrated embodiment, the angled reflective surface 174 has an approximate angle of 45 degrees, is horizontally aligned with the respective optical element 172, and is vertically aligned with the channel 170. Where the channel 170 is largely formed as part of one of the two housings, the angled reflective surface 174 associated with the other one of the two housings in at least some instances will extend beyond its own housing and into the portion of the channel 170, which largely exists in the other housing.

Figure 3:
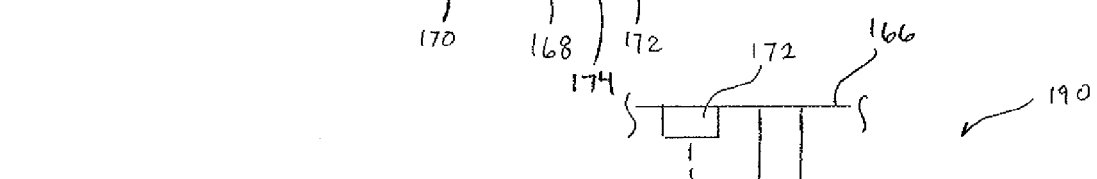
FIG. 3 is an enlarged partial view of at least some of the elements of the optical communication system, illustrated in FIGS. 2A and 2B.
Figure 3:
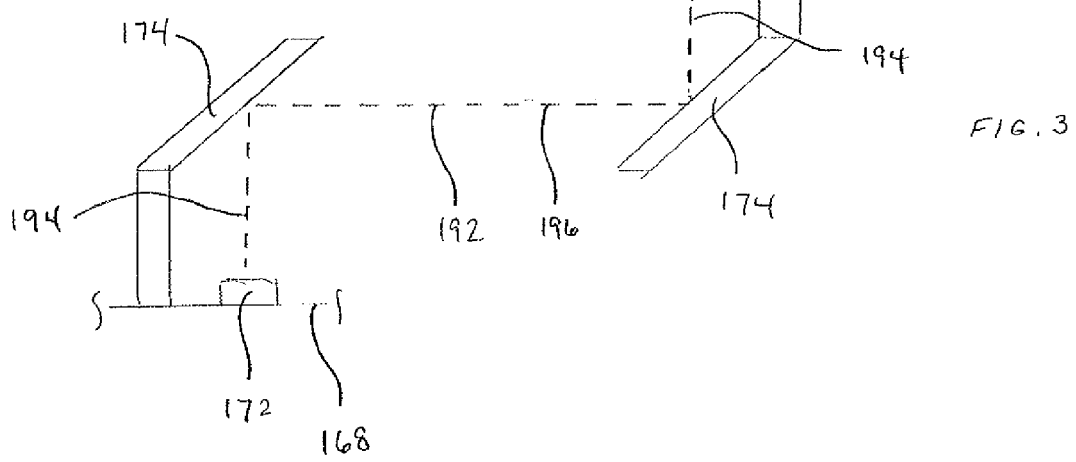

FIG. 3 illustrates an enlarged partial view 190 of at least some of the elements of the optical communication system, shown in FIGS. 2A and 2B. In such an arrangement, the anticipated light path 192 has a vertical component 194 proximate each of the two optical elements, which allows the light to traverse the distance from the corresponding optical element's mounting relative to the respective substrate 166 or 168 to the channel 170 (illustrated in FIGS. 2A and 2B). The light path further has a horizontal component 196 resulting from the reflection responsive to the interaction with the angled reflective surface 174, which can expand and contract with the relative movement of the upper and lower housings 162 and 164, while still maintaining a suitable alignment for the light path traversing between the respective pair of optical elements 172. In this way a communication path 192 can be maintained irrespective of the relative positioning of the upper and lower housings 162 and 164. In order to maintain a suitable alignment during any respective movement of the upper and lower housings 162 and 164, in the illustrated embodiment, the channel 170 is aligned along the length of the channel in a direction, which is consistent with the relative movement 106 of the two housings elements 162 and 164. Furthermore, in the illustrated embodiment, the angled reflective surfaces 174 are positioned relative to their respective substrate 166 and 168 and the channel 170, so that as the upper and lower housings 162 and 164 move relative to one another, the angled reflective surfaces travel in a direction which largely traces the communication path 192 along the horizontal component 196.

While the embodiment illustrated in FIGS. 2A and 2B provide for a channel which is largely formed as part of the lower housing 164, one skilled in the art can readily appreciate that the channel could alternatively be largely formed as part of the upper housing 162, or could be partially formed in each of the upper housing 162 and the lower housing 164, without departing from the teachings of the present invention.

To accommodate any such change, the height of the respective angled reflective surface 174 can be adjusted accordingly.

FIGS. 4A and 4B illustrate cut away views 200 and 210 showing the interaction of elements of an optical communication system in multiple use positions, which support the conveyance of an optical communication signal between multiple housing parts of a device, in accordance with at least a further embodiment of the present invention. In the further embodiment, the angled surfaces are avoided by elevating optical elements 272, such that the area of emission and the area of detection are vertically aligned relative to one another, at a vertical position that coincides with a channel 270. The optical elements 272 are further selected and/or are oriented such that the light more optimally enters or exits the optical element 272 in a direction of projection that extends along and/or is consistent with the lengthwise direction of the channel (i.e. in the horizontal direction, as illustrated).

The embodiment illustrated in FIGS. 4A and 4B further differ from the interaction of elements illustrated in FIGS. 2A and 2B, in that the channel 270 is formed partially in each of the upper and lower housings 262 and 264. However, as noted above with respect to FIGS. 2A and 2B, it is equally possible to largely implement the channel 270 as part of one of the upper and lower housings 262 and 264, such a modification being possible through an alternative formation of the channel, and a corresponding adjustment in the elevation of the optical elements 272.

To provide for the vertical positioning of the optical elements 272 relative to the corresponding substrates 266 and 268, spacers 276 may be employed, which provide for the stabilized positioning of the optical elements 272 at a position that is elevated with respect to the respective substrate 266 or 268, so as to correspond to the position of the channel 270.

FIG. 5 illustrates an enlarged partial view of at least some of the elements of the optical communication system, shown in FIGS. 4A and 4B including the optical elements 272, spacers 276, substrates 266 and 268, and a corresponding optical path 292. Whereas the optical path 192, illustrated in FIG. 3, included both vertical and horizontal components 194 and 196, the optical path 292, illustrated in FIG. 5, largely consists of a horizontal component 296. Nevertheless, similar to the embodiment illustrated in FIGS. 2A and 2B, the communication path 292 can be maintained irrespective of the relative slidable positioning of the upper and lower housings 266 and 268.

FIG. 6 illustrates an enlarged partial view of a still further alternative configuration of elements for use in an optical communication system of the type shown in FIGS. 2A and 2B and FIGS. 4A and 4B. The embodiment illustrated in FIG. 6 similarly employs a spacer 286 to raise an optical element 282 so as to be in vertical alignment with the anticipated optical path 292. As shown, the spacers 286 can be formed from a further printed circuit substrate 286, which is coupled to the main substrate 266 or 268 at an angle. In the illustrated embodiment, the further printed circuit substrate 286 is coupled to the main substrate at an angle, which is substantially perpendicular. The further substrate 286 further allows for the use of an optical element 282, which is oriented in a direction where the light more optimally enters or exits the optical element 282, which is consistent with the optical element 172 illustrated in FIG. 3, while still being in a direction consistent with the length of the channel (i.e. horizontal) without the use of an angled surface.

FIG. 7 illustrates a cross sectional view 300 of an embodiment consistent with the present invention, that includes a plurality of channels 370 which each form a separate path for light to travel between a respective pair of optical elements 372 including a corresponding optical transmitter and receiver. As illustrated in FIG. 7, the cross sectional view 300 cuts along a line that is largely perpendicular to direction of movement 106, illustrated in FIG. 1. Each channel 370 supports a different corresponding pair of optical elements 372, where respective ones of the pair of optical elements 372 is capable of at least one of transmitting or receiving an optical signal, that is intended to be conveyed along the respective channel. The signal is conveyed a varying distance dependent upon the relative position of the separate housing elements (i.e. upper and lower). In at least some instances, the surface of the channel 370 can be formed from or coated with a reflective material, that enables more of the light to be conveyed along the path with less of the light being absorbed by the surrounding structure. Intervening ridges 398 located between the various channels 370 helps limit the amount of light originating in a first channel from finding its way into another one of the channels, and interfering with any communication native to the channel.

In at least some embodiments, some of the channels will support the communication of signals from a first housing element to a second housing element, while at least some of the other channels will support the communication of signals in the opposite direction (i.e. second housing element to the first housing element). However, such a structure does not preclude the possibility of sub-channels, or for the sequential or simultaneous communication of signals in opposite directions, relative to any particular one of the channels, as noted above.

FIGS. 8A and 8B illustrate partial internal plan views 400 and 410 showing an opening mechanism for facilitating the movement of multiple housing elements 402 and 404 between multiple use positions in a device having at least two housing elements, that move relative to one another. The opening mechanism supports one or more optical communication channels of an optical communication system, as part of the structure associated with the opening mechanism. In the illustrated embodiment, the opening mechanism includes a couple of concentric rods, which couple together in telescoping fashion, including an inner rod 406 and an outer rod 408 that are allowed to separately travel laterally relative to one another in response to one or more forces including a force exerted by a biasing element, such as a spring 412. In at least some implementations including the particular implementation illustrated, the concentric rods 406 and 408 are located between the substrate associated with each of the two housing elements 402 and 404.

Each rod has a corresponding end, which is not directly associated with the overlapping insertion, that is relatively fixed with respect to an alternative one of the two housing elements 402 or 404. In the illustrated exemplary embodiment, an end 414 of the outer rod 408 is relatively fixed with respect to housing element 404, while end 416 of the inner rod 406 is relatively fixed with respect to housing element 402. The coupling is said to be relatively fixed in so far as, that in at least the illustrated embodiment, the end represents a pivot point about which the respective rod can at least partially rotate. Nevertheless, even with the ability to rotate, the relatively fixed end provides a substantially fixed landing zone associated with the corresponding housing element proximate the end of the corresponding rod for the placement of an associated optical element, that is positioned to transmit or receive an optical signal regardless of the rod's rotation. The inner and outer rods 406, 408, together, form a telescoping light pipe through which an optical signal can propagate.

FIG. 9 illustrates a partial side view 500 of the opening mechanism shown in FIG. 8, for providing at least one optical communication path, in accordance with at least one embodiment of the present invention. The opening mechanism includes a pair of telescoping concentric inner and outer rods 406, 408, and a spring 412. As noted above, the spring 412 applies a force to the inner and outer rods 406, 408, thereby biasing the rods relative lateral position, (i.e. degree of overlap).

Each rod includes an end, which is intended to be relatively fixed with respect to the corresponding housing element. In the illustrated embodiment, the relatively fixed ends 414 and 416 are shown positioned relative to a respective substrate 566, 568, and the respective optical element 572, and include a corresponding angled reflective surface 474 against which the light entering and exiting can reflect and change direction, thereby altering the course of the light path 592. This allows the light to change from a largely vertical direction to a largely horizontal direction, where the amount of telescoping of the inner and outer rods 406 and 408 determines the relative distance of the horizontal travel between entrance and exit points.

The telescoping of the inner and outer rods 406, 408 serves to maintain alignment of the rods relative to one another, as well as the corresponding angled reflective surface, even though the rods may rotate at a point proximate the fixed ends 414 and 416, and may rotate relative to the corresponding housing element and the associated optical element 572. Curved surfaces 476 associated with each of the rods 406, 408, at various points along the length of the anticipated light path, can produce effects consistent with a lens that serves to adjust the direction that the light travels. In the illustrated embodiment, the various convex surfaces serve to help consolidate and refocus the light traveling along the length of the respective rods in an attempt to concentrate more of the light onto the surface of the optical element 572, which is intended to be the recipient of the light.

FIG. 10 illustrates a partial side view 600 of the opening mechanism illustrated in FIG. 8, for providing at least a pair of optical communication paths, in accordance with at least a further embodiment of the present invention. In the partial side view 600 illustrated in FIG. 10, an example of how a particular channel could be subdivided is shown. In the particular embodiment illustrated, a further inner concentric rod 604 is provided, which is associated with and largely fixed relative to an outer rod 608. The two rods 604 and 608, in combination, telescope with respect to an intermediate rod 606, where the inner rod 604 inserts inside the intermediate rod 606, and the outer rod 608 encapsulates the intermediate rod 606 at the end opposite the relatively fixed end.

The inner rod 604 has an end 620, having an opening 622 that is associated with a first sub-channel, which extends along the interior of the inner rod 604. At the other end 624 of the inner rod 604, the light that travels along the interior of the inner rod 604 can transition to the interior 626 of the intermediate rod 606, and continue traveling along the remaining length of the intermediate rod 606 to the end 628 of the intermediate rod 606 that does not receive (i.e. telescope with respect to) the inner rod 604. At the non-telescoping ends 620 and 628 of each of the inner rod 604 and the intermediate rod 606, an optical element 672 can be positioned to serve as either a source of an optical signal (i.e. transmitter) or as a detector of an optical signal (i.e. receiver). In the exemplary embodiment illustrated, a line of arrows defines a potential flow path of an optical signal. As illustrated, an optical signal is produced at the optical element 672 placed proximate the opening 622 of the inner rod 604, and the optical signal is detected at the optical element 672 placed proximate the opening of the intermediate rod 606.

The interior of the inner rod 604 can enclose an air or free space passageway, or it can enclose an optically transmissive material along which light can propagate. Generally, the interior of the intermediate rod 606 will need to encompass an air or free space passageway, as any optically transmissive material formed from any generally immutable solid substance would interfere with the at least partial insertion of the inner rod 604, and any corresponding telescoping of the two.

A second subchannel is illustrated, which follows a path originating at the non-telescoping end 628 of the intermediate rod 606. In the illustrated example, the light enters the sidewall of the intermediate rod 606, which is formed of a optically transmissive material. A cladding material on the external or the internal surfaces of the sidewall can help preclude a larger percentage of the light from escaping from the intermediate rod 606 prematurely (i.e. prior to reaching the telescoping end). A reflective cladding material on the interior surface of the intermediate rod 606 can also serve to preclude light associated with the first subchannel from entering the side wall. Upon reaching the telescoping end of the intermediate rod 606, the light is intended to transition between the sidewall of the intermediate rod 606 to the space between the exterior of the interior rod 604 and the interior of the exterior rod 608.

A second set of optical elements 672 can be placed to serve as a source or a collector of light traveling between the non-telescoping end points of the second subchannel. In the illustrated embodiment, a line of arrows or arrow path defines an exemplary signal flow path in a, which originates at the sidewall of the non-telescoping end of the intermediate rod 606, and ends at the space between the non-telescoping ends of the interior rod 604 and the exterior rod 608. In this way, multiple subchannels can be supported in association with an opening mechanism.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An optical communication system for conveying signals between a first and a second housing element of a device, where the first and second housing elements are adapted to move relative to one another, the communication system comprising:

one or more optical light sources, each optical light source being coupled to one of the first and second housing elements; and one or more optical detectors, each optical detector corresponding to a respective one of the one or more optical light sources between which an optical communication connection via a respective one of one or more point to point communication paths is established, each of the one or more optical detectors being coupled to the other one of the first and second housing element, to which the respective corresponding optical light source is not coupled; and wherein as the housing elements move relative to one another, the corresponding one or more optical light sources move relative to the corresponding respective one of the one or more optical detectors, while maintaining the point to point communication connection between a common point of the corresponding one or more optical light sources and a common point of the respective one of the one or more optical detectors.

2. An optical communication system of claim 1 wherein the first and second housing elements travel along respective substantially parallel paths.

3. An optical communication system of claim 1 wherein the first and second housing elements are incorporated as part of a communication device having a slider configuration.

4. An optical communication system of claim 3 wherein the communication device is a radio telephone.

5. An optical communication system of claim 1 wherein at least some of the one or more communication paths travel along respective channels.

6. An optical communication system of claim 5 wherein one or more of the channels are at least partially recessed into at least one of the first and second housing elements.

7. An optical communication system of claim 5 wherein at least some of the channels include one or more optically reflective surfaces.

8. An optical communication system of claim 5 wherein at least some of the channels include a light pipe.

9. An optical communication system of claim 8 wherein the light pipe includes at least two segments, which laterally move concentrically relative to one another, where the amount of the length of overlap between the two segments varies with the lateral concentric movement.

10. An optical communication system of claim 9 wherein the light pipe further includes a tension device, which variably biases the two segments relative to one another as the amount of overlap between the two segments changes.

11. An optical communication system of claim 10 wherein the bias applied to the two segments of the light pipe biases the first and the second housing elements toward one of an open or a closed position.

12. An optical communication system of claim 10 wherein the tension device is a spring.

13. An optical communication system of claim 8 wherein the light pipe includes a plurality of optically discrete conduits adapted to separately form a different point to point communication path.

14. An optical communication system of claim 8 wherein the light pipe includes a pair of end points, and wherein at least one of the end points a lens is coupled thereto for adjusting the path of the optical light entering or exiting the light pipe.

15. An optical communication system of claim 1 wherein each of the first and second housing elements include a respective substrate to which respective ones of the one or more optical light sources and the one or more optical detectors are coupled; and
wherein the optical communication system further comprises one or more angled reflective surfaces, which are adapted for redirecting an optical signal between respective point to point communication paths and respective ones of the one or more optical light sources and the one or more optical detectors coupled to the respective substrate.

16. An optical communication system of claim 1 wherein each of the first and second housing elements include a respective substrate to which respective ones of the one or more optical light sources and the one or more optical detectors are coupled; and
wherein one or more of the optical light sources and the optical detectors extend into the respective communication path from the respective substrate.

17. An optical communication system of claim 16 wherein the at least some of the one or more of the optical light sources and the optical detectors, which extend into the respective communication path from the respective substrate, are coupled to the respective substrate via a spacer.

18. An optical communication system of claim 17 wherein the respective substrates for each of the first and second housing elements include a main printed circuit substrate, and the spacer includes a further printed circuit substrate that is coupled to the main printed circuit substrate.

19. A wireless communication device comprising:
a two part housing including a first housing element and a second housing element adapted to move relative to one another; and
an optical communication system for conveying signals between the first housing element and the second housing element, the communication system including
one or more optical light sources, each optical light source being coupled to one of the first and second housing elements, and
one or more optical detectors, each optical detector corresponding to a respective one of the one or more optical light sources between which an optical communication connection via a respective one of one or more point to point communication paths is established, each of the one or more optical detectors being coupled to the other one of the first and second housing element, to which the respective corresponding optical light source is not coupled; and
wherein as the housing elements move relative to one another, the corresponding one or more optical light sources move relative to the corresponding respective one of the one or more optical detectors, while maintaining the point to point communication connection between a common point of the corresponding one or more optical light sources and a common point of the respective one of the one or more optical detectors.

20. A wireless communication device of claim 19 wherein the first and second housing elements are incorporated as part of a communication device having a slider configuration.

* * * * *